United States Patent
Yoda et al.

(10) Patent No.: US 11,104,172 B2
(45) Date of Patent: Aug. 31, 2021

(54) INTERMEDIATE TRANSFER MEDIUM, COMBINATION OF INTERMEDIATE TRANSFER MEDIUM AND THERMAL TRANSFER SHEET, AND METHOD FOR FORMING PRINT

(71) Applicant: Dai Nippon Printing Co., Ltd., Tokyo (JP)

(72) Inventors: Shinya Yoda, Tokyo (JP); Yasushi Yoneyama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 204 days.

(21) Appl. No.: 16/083,124

(22) PCT Filed: Mar. 17, 2017

(86) PCT No.: PCT/JP2017/011007
§ 371 (c)(1),
(2) Date: Sep. 7, 2018

(87) PCT Pub. No.: WO2017/159870
PCT Pub. Date: Sep. 21, 2017

(65) Prior Publication Data
US 2019/0023048 A1 Jan. 24, 2019

(30) Foreign Application Priority Data
Mar. 18, 2016 (JP) .............................. JP2016-055718

(51) Int. Cl.
*B41M 5/50* (2006.01)
*B41M 5/52* (2006.01)
(Continued)

(52) U.S. Cl.
CPC ........... *B41M 5/5209* (2013.01); *B32B 27/00* (2013.01); *B32B 27/06* (2013.01); *B32B 27/28* (2013.01);
(Continued)

(58) Field of Classification Search
CPC ...... B41M 5/40; B41M 5/42; B41M 2205/30; B41M 2205/38
(Continued)

(56) References Cited

U.S. PATENT DOCUMENTS

2003/0117481 A1    6/2003  Kometani et al.
2003/0188822 A1*  10/2003  Kuroki ............... B41M 5/38257
                                                                         156/235
(Continued)

FOREIGN PATENT DOCUMENTS

EP    0 529 691 A1    3/1993
EP    3 284 608 A1    2/2018
(Continued)

OTHER PUBLICATIONS

Extended European Search Report (Application No. 17 766 865.4) dated Feb. 19, 2019.
(Continued)

*Primary Examiner* — Betelhem Shewareged
(74) *Attorney, Agent, or Firm* — Burr & Brown, PLLC

(57) ABSTRACT

An intermediate transfer medium that allows formation of high-density images on a transfer layer while suppressing printing unevenness and provides good foil cutting properties of the transfer layer, a combination of the intermediate transfer medium and a thermal transfer sheet, and a method for forming a print using the intermediate transfer medium. In an intermediate transfer medium having a transfer layer on a substrate, the transfer layer has a single layer structure including only a receiving layer or a layered structure
(Continued)

including the receiving layer. When the transfer layer has the layered structure, the receiving layer is located furthest from the substrate among layers constituting the transfer layer. The receiving layer contains a binder resin having a number average molecular weight of 8000-32000 and a release agent. The content of the release agent based on the total mass of the receiving layer is 6% by mass or more.

1 Claim, 2 Drawing Sheets

(51) Int. Cl.
*B32B 27/00* (2006.01)
*B32B 27/06* (2006.01)
*B32B 27/28* (2006.01)
*B32B 7/12* (2006.01)
*B32B 27/08* (2006.01)
*B32B 27/30* (2006.01)
*B32B 27/36* (2006.01)

(52) U.S. Cl.
CPC .............. *B41M 5/52* (2013.01); *B32B 7/12* (2013.01); *B32B 27/08* (2013.01); *B32B 27/304* (2013.01); *B32B 27/36* (2013.01); *B32B 2307/4026* (2013.01); *B32B 2307/748* (2013.01); *B41M 5/5227* (2013.01); *B41M 5/5254* (2013.01); *B41M 5/5263* (2013.01); *B41M 5/5272* (2013.01)

(58) Field of Classification Search
USPC ........................................................ 428/32.6
See application file for complete search history.

(56) References Cited

U.S. PATENT DOCUMENTS

| | | |
|---|---|---|
| 2006/0240202 A1 | 10/2006 | Ishida |
| 2007/0292639 A1 | 12/2007 | Hirota |
| 2013/0164463 A1 | 6/2013 | Yoda et al. |
| 2019/0023048 A1* | 1/2019 | Yoda ...................... B32B 27/00 |

FOREIGN PATENT DOCUMENTS

| | | |
|---|---|---|
| JP | S57-111361 A1 | 7/1982 |
| JP | H07-052522 A1 | 2/1995 |
| JP | H08-002128 A1 | 1/1996 |
| JP | 2000-218947 A1 | 8/2000 |
| JP | 2003-145816 A1 | 5/2003 |
| JP | 2003-145699 A1 | 6/2003 |
| JP | 2003-175699 A1 | 6/2003 |
| JP | 2006-123526 A1 | 5/2006 |
| JP | 2006-306064 A1 | 11/2006 |
| JP | 2009-023341 A1 | 2/2009 |
| JP | 2009-160765 A1 | 7/2009 |
| JP | 2009-233969 A1 | 10/2009 |
| JP | 2012-051213 A1 | 3/2012 |
| JP | 2012-071545 A1 | 4/2012 |
| JP | 2014-047227 A1 | 3/2014 |
| JP | 2016-027162 A1 | 2/2016 |

OTHER PUBLICATIONS

International Search Report and Written Opinion (Application No. PCT/JP2017/011007) dated May 16, 2017.

* cited by examiner

INTERMEDIATE TRANSFER MEDIUM, COMBINATION OF INTERMEDIATE TRANSFER MEDIUM AND THERMAL TRANSFER SHEET, AND METHOD FOR FORMING PRINT

FIELD OF THE INVENTION

The present invention relates to an intermediate transfer medium, a combination of an intermediate transfer medium and a thermal transfer sheet, and a method for forming a print.

BACKGROUND OF THE INVENTION

An intermediate transfer medium in which a transfer layer obtained by laminating a protective layer and a receiving layer in this order from a substrate side is provided on the substrate, and the like is used as a medium for forming a print without concern for the constraints about the kind of transfer receiving article (for instance, Patent Document 1). According to the intermediate transfer medium, using a thermal transfer sheet having a colorant layer, a thermal transferred image is formed on the receiving layer located on the outermost surface of the intermediate transfer medium, and the transfer layer including the receiving layer on which the thermal transferred image is formed is then transferred on an optional transfer receiving article, whereby a print in which the thermal transferred image is formed on the transfer receiving article can be obtained.

For the intermediate transfer medium, the following (i), (ii), and (iii) are required: (i) a high-density thermal transferred image can be formed on the receiving layer located on the outermost surface of the transfer layer; (ii) the occurrence of printing unevenness in the thermal transferred image formed on the receiving layer can be suppressed; and (iii) the foil cutting properties of the transfer layer when the transfer layer including the receiving layer on which the thermal transferred image is formed is transferred on the transfer receiving article are good. Particularly, there is required an intermediate transfer medium which can simultaneously satisfy the (i) and (ii) even when a printing energy during the formation of the thermal transferred image is increased in order to correspond to the acceleration of a printer. An intermediate transfer medium which satisfies the (i), (ii), and (iii) is required.

PRIOR ART LITERATURE

Patent Literature

Patent Document 1: JP 2012-71545 A

SUMMARY OF THE INVENTION

Problems to be Solved by the Invention

However, the intermediate transfer medium known at the present has not reached the stage to sufficiently satisfy all the demands of the (i) to (iii). Therefore, there is a room for improvement for this point.

The present invention has been made in view of the above-mentioned circumstances, and the present invention aims principally to provide an intermediate transfer medium which allows the formation of a high-density thermal transferred image on a receiving layer constituting a transfer layer while suppressing the occurrence of printing unevenness and provides good foil cutting properties of the transfer layer when the transfer layer including the receiving layer on which the thermal transferred image is formed is transferred, a combination of the intermediate transfer medium and a thermal transfer sheet, and a method for forming a print using the intermediate transfer medium.

Means for Solving the Problems

An intermediate transfer medium according to an embodiment of the present disclosure for solving the above-mentioned problems is an intermediate transfer medium including a substrate and a transfer layer provided on the substrate, wherein: the transfer layer has a single layer structure including only a receiving layer or a layered structure including a receiving layer; when the transfer layer has the layered structure, the receiving layer is located furthest from the substrate among layers constituting the transfer layer; the receiving layer contains a binder resin having a number average molecular weight (Mn) of 8000 or more and 32000 or less and a release agent; and the content of the release agent based on the total mass of the receiving layer is 6% by mass or more.

The binder resin having a number average molecular weight (Mn) of 8000 or more and 32000 or less may be a vinyl chloride type resin or a polyester resin.

A combination of an intermediate transfer medium and a thermal transfer sheet according to an embodiment of the present disclosure for solving the above-mentioned problems is a combination, wherein: the intermediate transfer medium is the intermediate transfer medium having the feature; and the thermal transfer sheet is (i) a combination of a thermal transfer sheet having a colorant layer and a thermal transfer sheet having a heat sealing layer, or (ii) a thermal transfer sheet having the colorant layer and the heat sealing layer provided as being frame sequentially.

In the combination, the heat sealing layer of the thermal transfer sheet may contain a binder resin having a number average molecular weight (Mn) of 4000 or more and 32000 or less. In the combination, the heat sealing layer of the thermal transfer sheet may contain a binder resin which has a smaller number average molecular weight (Mn) than that of the binder resin contained in the receiving layer and having a number average molecular weight (Mn) of 8000 or more and 32000 or less, and has a number average molecular weight (Mn) of 4000 or more.

A method for forming a print according to an embodiment of the present disclosure for solving the above-mentioned problems includes: an intermediate transfer medium preparing step of preparing an intermediate transfer medium having a transfer layer; a thermal transfer sheet preparing step of preparing (i) a combination of a thermal transfer sheet having a colorant layer and a thermal transfer sheet having a heat sealing layer or (ii) a thermal transfer sheet having the colorant layer and the heat sealing layer provided as being frame sequentially; a transfer receiving article preparing step of preparing a transfer receiving article; a thermal transferred image forming step of combining the intermediate transfer medium with the thermal transfer sheet, and forming a thermal transferred image on the transfer layer of the intermediate transfer medium using the colorant layer of the thermal transfer sheet; a heat sealing layer transferring step of transferring the heat sealing layer of the thermal transfer sheet on the transfer layer on which the thermal transferred image is formed; and a transfer foil transferring step of combining the intermediate transfer medium on which the heat sealing layer is transferred, with the transfer receiving article, and transferring a transfer foil obtained by laminating the transfer layer on which the thermal transferred image is formed, and the heat sealing layer in this order on the transfer receiving article, wherein in the intermediate transfer medium preparing step, prepared is the intermediate transfer medium in which: the transfer layer has a single layer structure including only a receiving layer or a layered structure in which a receiving layer is located on the outermost surface of the transfer layer; the receiving layer contains a binder resin having a number average molecular weight (Mn) of 8000 or more and 32000 or less and a release agent; and the content of the release agent based on the total mass of the receiving layer is 6% by mass or more.

A method for forming a print according to one embodiment includes: an intermediate transfer medium preparing step of preparing an intermediate transfer medium in which a transfer layer is provided on a first substrate; a thermal transfer sheet preparing step of preparing a thermal transfer sheet in which a colorant layer and a heat sealing layer are provided as being frame sequentially on one surface of a second substrate; a transfer receiving article preparing step of preparing a transfer receiving article; a thermal transferred image forming step of combining the intermediate transfer medium with the thermal transfer sheet, and forming a thermal transferred image on the transfer layer of the intermediate transfer medium using the colorant layer of the thermal transfer sheet; a heat sealing layer transferring step of transferring the heat sealing layer of the thermal transfer sheet on the transfer layer on which the thermal transferred image is formed; and a transfer foil transferring step of combining the intermediate transfer medium on which the heat sealing layer is transferred, with the transfer receiving article and transferring a transfer foil obtained by laminating the transfer layer on which the thermal transferred image is formed, and the heat sealing layer in this order from the first substrate side on the transfer receiving article, wherein in the intermediate transfer medium preparing step, prepared is the intermediate transfer medium in which: the transfer layer has a single layer structure including only a receiving layer or a layered structure in which a receiving layer is located furthest from the first substrate; the receiving layer contains a binder resin having a number average molecular weight (Mn) of 8000 or more and 32000 or less and a release agent; and the content of the release agent based on the total mass of the receiving layer is 6% by mass or more.

In the method for forming a print, the heat sealing layer of the thermal transfer sheet prepared in the thermal transfer sheet preparing step may contain a binder resin having a number average molecular weight (Mn) of 4000 or more and 32000 or less. In the method for forming a print, the heat sealing layer of the thermal transfer sheet may contain a binder resin which has a smaller number average molecular weight (Mn) than that of the binder resin contained in the receiving layer and having a number average molecular weight (Mn) of 8000 or more and 32000 or less, and has a number average molecular weight (Mn) of 4000 or more.

A method for forming a print according to an embodiment of the present disclosure for solving the above-mentioned problems includes: an intermediate transfer medium preparing step of preparing an intermediate transfer medium having a transfer layer; a thermal transfer sheet preparing step of preparing a thermal transfer sheet having a colorant layer; a transfer receiving article preparing step of preparing a transfer receiving article; a thermal transferred image forming step of combining the intermediate transfer medium with the thermal transfer sheet, and forming a thermal transferred image on the transfer layer of the intermediate transfer medium using the colorant layer of the thermal transfer sheet; a transferring step of combining the intermediate transfer medium having the transfer layer on which the thermal transferred image is formed, with the transfer receiving article, and transferring the transfer layer on which the thermal transferred image is formed on the transfer receiving article, wherein in the intermediate transfer medium preparing step, prepared is the intermediate transfer medium in which: the transfer layer has a single layer structure including only a receiving layer or a layered structure in which a receiving layer is located on the outermost surface of the transfer layer; the receiving layer contains a binder resin having a number average molecular weight (Mn) of 8000 or more and 32000 or less and a release agent; and the content of the release agent based on the total mass of the receiving layer is 6% by mass or more.

Effect of the Invention

An intermediate transfer medium, and a combination of the intermediate transfer medium and a thermal transfer sheet according to an embodiment of the present disclosure allow the formation of a high-density thermal transferred image on a receiving layer constituting a transfer layer while suppressing the occurrence of printing unevenness and can provide good foil cutting properties of the transfer layer when the transfer layer including the receiving layer on which the thermal transferred image is formed is transferred. A method for forming a print according to an embodiment of the present disclosure can form a high quality print.

DETAILED DESCRIPTION OF THE INVENTION

<<Intermediate Transfer Medium>>

Figure 1:
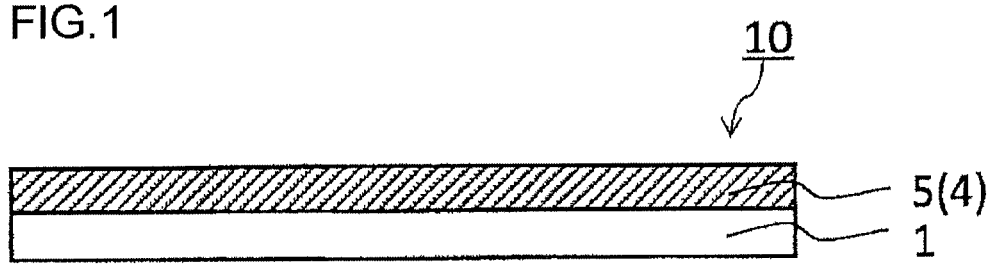
FIG. 1 is a schematic sectional view showing an example of an intermediate transfer medium according to one embodiment.

Hereinafter, an intermediate transfer medium according to an embodiment of the present disclosure (hereinafter, referred to as an intermediate transfer medium according to one embodiment) will be specifically described. The present invention can be carried out in many different aspects, and is not construed to be limited to the described contents of an embodiment exemplified below. In the drawings, the width, thickness, and shape and the like of each part may be schematically represented as compared with an actual aspect in order to provide more clear description, but these are consistently examples, and do not limit the construe of the present invention. The same numerals may be applied to the same elements as those previously described with reference to the aforementioned drawings in the specification of the present application and each of the drawings, the detailed descriptions thereof being appropriately omitted.

Figure 2:
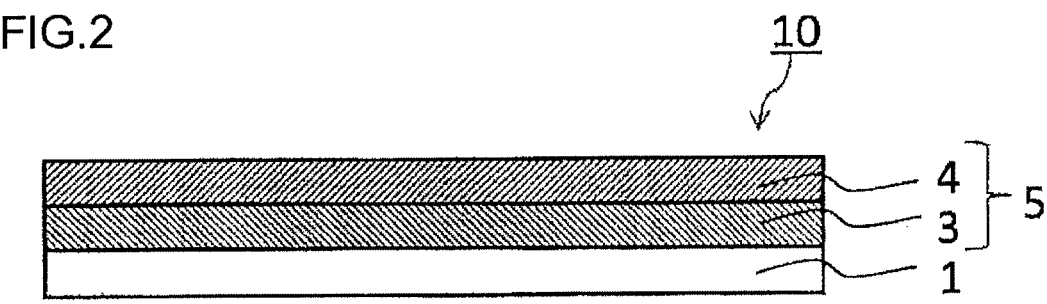
FIG. 2 is a schematic sectional view showing an example of an intermediate transfer medium according to one embodiment.

As shown in FIG. 1 and FIG. 2, in an intermediate transfer medium 10 according to one embodiment, a transfer layer 5 is provided on one surface of a substrate 1, and the transfer layer 5 has a single layer structure including only a receiving layer 4, or a layered structure including the receiving layer 4. In an embodiment shown in FIG. 1, the transfer layer 5 has the single layer structure including only the receiving layer 4. In an embodiment shown in FIG. 2, the transfer layer 5 has the layered structure including the receiving layer 4.

(Substrate)

The substrate 1 is the essential constituent in the intermediate transfer medium 10, and provided in order to sustain the transfer layer 5. The substrate 1 is not particularly limited, and as the substrate, unstretched or stretched plastic films, for instance, polyesters having high heat resistance such as polyethylene terephthalate and polyethylene naphthalate; polypropylene; polycarbonate; cellulose acetate; polyethylene derivatives; polyamides, and polymethylpentene, etc., can be exemplified. Composite films obtained by laminating two or more of these materials can be also used. The thickness of the substrate 1 may be appropriately selected depending on the kind of the material used, so that the strength, heat resistance and the like of the substrate lie in appropriate ranges. Generally, the thickness is within the range of 4 μm or more and 30 μm or less, and preferably within the range of 6 μm or more and 20 μm or less.

(Transfer Layer)

As shown in FIG. 1 and FIG. 2, the transfer layer 5 is provided on the substrate 1. The transfer layer 5 is provided so that it is able to be exfoliated from the substrate 1. The transfer layer 5 is exfoliated from the substrate 1 by heat transfer, and transferred on a transfer receiving article 200 described later.

As shown in FIG. 1 and FIG. 2, the transfer layer 5 as an example has a single layer structure including the receiving layer 4 (may referred to as a transfer receiving layer) or a layered structure (having a layered structure in which a protective layer 3 and the receiving layer 4 are laminated in this order from the substrate 1 side in an embodiment shown in FIG. 2). In this case, the receiving layer 4 is located furthest from the substrate 1 among layers constituting the transfer layer 5. In other words, the receiving layer 4 is located on the outermost surface of the intermediate transfer medium 10. The receiving layer 4 has dye receptivity for receiving a dye contained in a colorant layer 51 (see FIG. 3 to FIG. 5) of a thermal transfer sheet 100, for instance, a sublimable dye, a fluorescent dye and the like.

"Receiving Layer"

In the intermediate transfer medium 10 according to one embodiment, the receiving layer 4 included in the transfer layer 5 contains a binder resin having a number average molecular weight (Mn) of 8000 or more and 32000 or less and a release agent, and the content of the release agent is 6% by mass or more based on the total mass of the receiving layer 4. The number average molecular weight (Mn) used herein denotes a number average molecular weight measured by Gel Permeation Chromatography (GPC) in terms of polystyrene standard based on JIS-K-7252-1 (2008).

The intermediate transfer medium 10 according to one embodiment including the receiving layer 4 having the feature allows the formation of a high-density thermal transferred image on the receiving layer 4 while suppressing the occurrence of printing unevenness. Particularly, a high-density thermal transferred image can be formed on the receiving layer 4 while suppressing the occurrence of printing unevenness even if an energy applied when a thermal transferred image is formed is increased in order to correspond to the acceleration of a printer. Furthermore, the intermediate transfer medium 10 according to one embodiment including the receiving layer 4 having the feature can provide good foil cutting properties of the transfer layer 5 when the transfer layer 5 including the receiving layer 4 on which the thermal transferred image is formed is transferred on the transfer receiving article.

The printing unevenness used herein is caused by releasability between a receiving layer and a colorant layer of a thermal transfer sheet for forming a thermal transferred image on the receiving layer, and denotes phenomena in which burnt deposit and dullness and the like occur in the thermal transferred image formed on the receiving layer. The foil cutting properties of the transfer layer used herein represent the degree of suppression of tailing when a transfer layer is transferred on a transfer receiving article, and denotes that the occurrence of the tailing can be sufficiently suppressed when the foil cutting properties are good. The tailing used herein denotes a phenomenon in which the transfer layer 5 is transferred so as to protrude to a non-transfer region side from a boundary between a transfer region and non-transfer region of the transfer layer 5 as a starting point when the transfer layer 5 is transferred on the transfer receiving article 200.

In the intermediate transfer medium 10 according to one embodiment, the binder resin contained in the receiving layer 4 has a number average molecular weight (Mn) of 8000 or more and 32000 or less as an essential condition. This is because the occurrence of printing unevenness cannot be sufficiently suppressed when a binder resin having a number average molecular weight (Mn) of less than 8000 is employed in place of the binder resin having a number average molecular weight (Mn) of 8000 or more and 32000 or less. When the binder resin having a number average molecular weight (Mn) of less than 8000 is employed as the binder resin contained in the receiving layer, the heat resistance of the receiving layer is excessively deteriorated, which makes it difficult to form the high-density thermal transferred image on the receiving layer.

On the other hand, when a binder resin having a number average molecular weight (Mn) of more than 32000 is employed in place of the binder resin having a number average molecular weight (Mn) of 8000 or more and 32000 or less, the occurrence of printing unevenness can be suppressed, but it may become difficult to form the high-density thermal transferred image. Furthermore, the foil cutting properties cannot be sufficiently satisfied.

In the intermediate transfer medium 10 of a preferred embodiment, the receiving layer 4 contains a binder resin having a number average molecular weight (Mn) of 10000 or more and 24000 or less. The intermediate transfer medium 10 of the preferred embodiment can provide further improved foil cutting properties.

In the intermediate transfer medium 10 according to one embodiment, the contents of not only the binder resin contained in the receiving layer but also the release agent contained in the receiving layer 4 are 6% by mass or more based on the total mass of the receiving layer 4 as an essential condition. This is because the occurrence of printing unevenness cannot be sufficiently suppressed when the receiving layer 4 does not contain the release agent even if the receiving layer 4 contains the binder resin having a number average molecular weight (Mn) of 8000 or more and 32000 or less, or the content of the release agent is less than 6% by mass.

That is, it can be said that the various effects in the intermediate transfer medium 10 according to one embodiment are not independent effects provided by setting the number average molecular weight (Mn) of the binder resin contained in the receiving layer 4 to the predetermined range, or setting the content of the release agent contained in the receiving layer 4 to the predetermined range but synergetic effects which can be first exhibited by satisfying both the conditions.

The binder resin contained in the receiving layer 4 can receive a colorant component contained in the colorant layer of the thermal transfer sheet, and a binder resin satisfying the condition of the number average molecular weight (Mn) of 8000 or more and 32000 or less can be appropriately selected and used. As the binder resin, for instance, vinyl chloride type resins; polyolefin type resins such as polypropylene; halogenated resins such as polyvinyl chloride and polyvinylidene chloride; vinyl type resins such as polyvinyl acetate, a vinyl chloride-vinyl acetate copolymer, an ethylene-vinyl acetate copolymer and polyacrylic ester; polyester resins such as polyethylene terephthalate and polybutylene terephthalate; polystyrene type resins; polyamide type resins; copolymers of an olefin such as ethylene or propylene and another vinyl polymer; ionomer or cellulosic resins such as cellulose diastase; polycarbonate; etc., can be exemplified.

Among the binder resins exemplified above, vinyl chloride type resins having a number average molecular weight (Mn) of 8000 or more and 32000 or less, and polyester resins having a number average molecular weight (Mn) of 8000 or more and 32000 or less allow the formation of a higher-density thermal transferred image on the receiving layer 4 while suppressing the occurrence of printing unevenness as compared with another binder resin having a number average molecular weight (Mn) of 8000 or more and 32000 or less, and can improve the transferring property of the transfer layer 5, which are preferred binder resins. Particularly, vinyl chloride type resins having a number average molecular weight (Mn) of 8000 or more and 32000 or less can more effectively suppress the occurrence of printing unevenness, which is preferred.

As the vinyl chloride type resin, for instance, a polymer obtained by subjecting vinyl chloride to homopolymerization, a copolymer of vinyl chloride and another monomer which can be copolymerized with vinyl chloride, and a mixture of the polymer and the copolymer can be exemplified. As the another monomer which can be copolymerized with vinyl chloride, for instance, vinylidene chloride, ethylene, propylene, acrylonitrile, maleic acid, itaconic acid, acrylic acid, methacrylic acid, vinyl acetate, etc. can be exemplified. These vinyl chloride type resins may be produced by any of producing methods known in the art such as an emulsion polymerization method, a suspension polymerization method, a solution polymerization method, and a mass polymerization method. The vinyl chloride type resins may be produced by methods other than these.

Among these vinyl chloride type resins, a vinyl chloride-vinyl acetate copolymer and a vinyl chloride homopolymer allow the formation of a higher-density thermal transferred image under a high thermal energy condition, which are preferred. Furthermore, in view of the production aptitude of a coating liquid for forming the receiving layer, and the like, a vinyl chloride-vinyl acetate copolymer is particularly preferred.

The receiving layer 4 may contain one binder resin having a number average molecular weight (Mn) of 8000 or more and 32000 or less solely, or two or more binder resins.

When the density of the thermal transferred image formed on the receiving layer 4, the foil cutting properties of the transfer layer 5, and the suppression effect of printing unevenness when the thermal transferred image is formed are intended to be further improved, the receiving layer 4 contains preferably 40% by mass or more, and more preferably 70% by mass or more of a binder resin having a number average molecular weight (Mn) of 8000 or more and 32000 or less based on the total mass of the receiving layer 4. Particularly, the receiving layer 4 contains preferably 40% by mass or more, preferably 50% by mass or more, and preferably 70% by mass or more of a vinyl chloride-vinyl acetate copolymer having a number average molecular weight (Mn) of 8000 or more and 32000 or less based on the total mass of the receiving layer.

The receiving layer 4 may contain a binder resin having a number average molecular weight (Mn) of less than 8000 and a binder resin having a number average molecular weight (Mn) of more than 32000 in addition to the binder resin having a number average molecular weight (Mn) of 8000 or more and 32000 or less. In this case, the content of the binder resin having a number average molecular weight (Mn) of less than 8000 or the binder resin having a number average molecular weight (Mn) of more than 32000 (the total amount of both the binder resins when the receiving layer 4 contains the binder resins) is preferably 30% by mass or less based on the total mass of the receiving layer 4.

The release agent is not particularly limited, and for instance, solid waxes such as polyethylene wax, amide wax, and Teflon (registered trademark) powder, fluorine type or phosphoric ester type surfactants, silicone, a silicone oil, etc. can be exemplified. Release agents known in the art other than these can be appropriately selected and used. The receiving layer 4 may contain one release agent solely, or may contain two or more release agents. When the receiving layer 4 contains the two or more release agents, the total mass of the two or more release agents may be 6% by mass or more based on the total mass of the receiving layer 4.

The receiving layer 4 of a preferred embodiment contains 8% by mass or more of the release agent based on the total mass of the receiving layer 4. The receiving layer 4 of the preferred embodiment can have higher releasability, and can achieve high-speed printing and high-density printing aptitude. The upper limit of the content of the release agent is not particularly limited, and is preferably 20% by mass or less, and more preferably 15% by mass or less in view of the adhesion between the transfer receiving article and the transfer layer 5 when the transfer layer 5 is transferred on the transfer receiving article. When the measures for improving the adhesion with the transfer layer 5 have been made on the transfer receiving article side, or when the transfer layer 5 is transferred on the transfer receiving article with the heat sealing layer interposed therebetween as described later, the preferred range of the upper limit of the release agent is not limited to the above-described range. Particularly, when the receiving layer 4 contains a vinyl chloride type resin or a polyester resin as the binder resin, the upper limit of the content of the release agent based on the total mass of the receiving layer 4 is set to be in the preferred range, whereby the adhesion between the transfer receiving article and the transfer layer 5 can be further improved.

The receiving layer 4 may contain any other additive(s) in addition to the binder resin having a number average molecular weight (Mn) of 8000 or more and 32000 or less and the release agent.

The method for forming the receiving layer 4 is not particularly limited. The receiving layer 4 can be formed by dissolving or dispersing the binder resin having a number average molecular weight (Mn) of 8000 or more and 32000 or less and the release agent in a suitable solvent to prepare a coating liquid for receiving layer, coating the coating liquid on the substrate 1 or an optional layer provided on the substrate 1, for instance, the protective layer 3, and drying the coating liquid. The method for coating the coating liquid for receiving layer is not particularly limited, and coating methods known in the art can be appropriately selected and used. As the coating method, for instance, a gravure printing method, a screen printing method, a reverse-coating method using a gravure plate, etc., can be exemplified. Coating methods other than these may also be used. The same things apply to methods for coating various coating liquids described later. The thickness of the receiving layer 4 is generally within the range of 0.5 μm or more and 10 μm or less.

"Protective Layer"

As shown in FIG. 2, the transfer layer 5 may also have a layered structure in which the protective layer 3 and the receiving layer 4 are laminated in this order from the substrate 1 side. As the materials constituting the protective layer 3, for instance, polyester resins, polycarbonate resins, acrylic resins, ultraviolet absorbing resins, epoxy resins, polystyrene resins, polyurethane resins, acrylic urethane resins, and silicone-modified forms of these resins, any blends of these resins, ionizing radiation curable resins, ultraviolet absorbing resins, etc., can be exemplified.

A protective layer containing an ionizing radiation curable resin can be suitably used as the binder resin for the protective layer, since the plasticizer resistance and the abrasion resistance properties thereof are particularly excellent. The ionizing radiation curable resin is not particularly limited, and can be appropriately selected and used from among the ionizing radiation curable resins known in the art. For instance, it is possible to use one in which a radically polymerizable polymer or oligomer is cross-linked and cured by irradiation of ionizing radiation, and polymerized and cross-linked by electron beam or ultraviolet light with adding a photo-polymerization initiator if necessary. A protective layer containing an ultraviolet absorbing resin is excellent in giving light resistance to the print.

As an ultraviolet absorbing resin, for instance, a resin which is prepared by reacting and linking a reactive ultraviolet absorbing agent to a thermoplastic resin or the ionizing radiation curable resin can be used. More specifically, those which are prepared by introducing a reactive group such as an addition-polymerizable double bond (for instance, vinyl group, acryloyl group, methacryloyl group, and the like), alcoholic hydroxyl group, amino group, carboxyl group, epoxy group, isocyanate group, into a nonreactive organic ultraviolet absorbing agent known in the art such as salicylate series, benzophenon series, benzotriazole series, substituted acrylonitrile series, nikkel-chelate series, hindered amine series, etc., can be exemplified.

If necessary, there may be added, for instance, lubricants, plasticizers, fillers, antistatic agents, anti-blocking agents, cross-linking agents, antioxidants, ultraviolet absorbing agents, light stabilizers, colorants such as dyes and pigments, other additives, and the like. The protective layer can be formed by dissolving or dispersing one or two or more of the resin materials exemplified above in a suitable solvent to prepare a coating liquid for protective layer, coating the coating liquid on the substrate 1 or an optional layer provided on the substrate 1, and drying the coating liquid. The thickness of the protective layer is generally within the range of 0.1 μm or more and 50 μm or less, and preferably within the range of 1 μm or more and 20 μm or less.

"Exfoliate Layer"

A layer located closest from the substrate 1 among the layers constituting the transfer layer 5 may also be an exfoliate layer (not shown). The transfer layer 5 having the exfoliate layer makes it possible to improve the transferring property (may be also referred to as peelable property) of the transfer layer 5 from the substrate 1.

The resin materials constituting the exfoliate layer are not particularly limited, and for instance, waxes, silicone waxes, silicone resins, silicone-modified resins, fluorine resins, modified fluorine resins, polyvinyl alcohols, acrylic resins, thermally cross-linkable epoxy-amino resins, thermally cross-linkable alkyd-amino resins, etc., can be exemplified. The exfoliate layer may contain a resin material having receptivity for the colorant component contained in the colorant layer of the thermal transfer sheet.

The method for forming the exfoliate layer is not particularly limited, and the exfoliate layer can be formed by dissolving or dispersing the resin in a suitable solvent to prepare a coating liquid for exfoliate layer, coating the coating liquid on the substrate 1, and drying the coating liquid. The thickness of the exfoliate layer is preferably within the range of 0.5 μm or more and 5 μm or less.

In order to improve the interlayer adhesion between layers constituting the transfer layer 5, a primer layer (not shown) may be provided between the layers constituting the transfer layer 5. As resin materials constituting the primer layer, for instance, ultraviolet absorbing agent copolymerizing resins, polyester type resins, polycarbonate type resins, butyral type resins, polyurethane type resins, polyester type resins, polyamide type resins, epoxy type resins, phenolic resins, polyvinyl chloride type resins, polyvinyl acetate type resins, vinyl chloride-vinyl acetate copolymers, acid-modified polyolefin type resins, copolymers of ethylene and vinyl acetate or acrylic acid and the like, (meth)acrylic resins, polyvinyl alcohol resins, polyvinyl acetal resins, polybutadiene type resins, rubber compounds, etc., can be exemplified. Fillers such as micro-silica and polyethylene wax may be used in combination.

A back face layer (not shown) may be provided on the other surface of the substrate 1. As the back face layer, various constitutions described as the back face layer of the thermal transfer sheet described later may be appropriately selected and used.

<<Thermal Transfer Sheet>>

Subsequently, the thermal transfer sheet used when the thermal transferred image is formed on the receiving layer 4 of the intermediate transfer medium 10 according to one embodiment described above will be described by way of an example.

Figure 3:
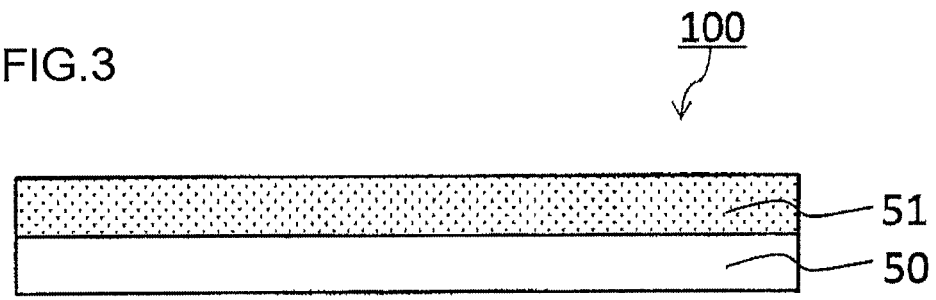
FIG. 3 is a schematic sectional view showing an example of a thermal transfer sheet.
Figure 4:
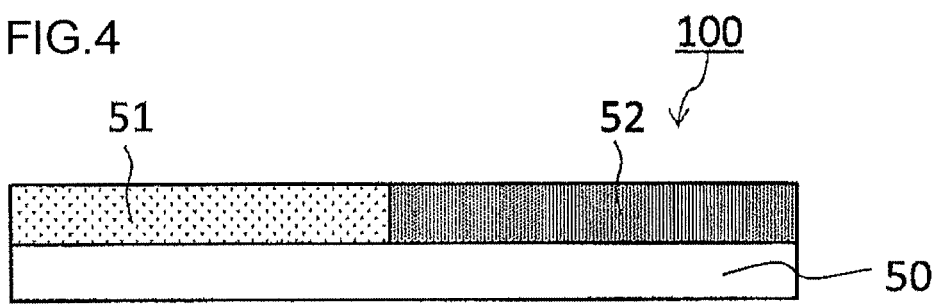
FIG. 4 is a schematic sectional view showing an example of a thermal transfer sheet.

As shown in FIG. 3, the thermal transfer sheet 100 as an example has a structure in which the colorant layer 51 is provided on a substrate 50 for thermal transfer sheet. As the thermal transfer sheet 100, as shown in FIG. 4, there may also be used a thermal transfer sheet in which the colorant layer 51 and a heat sealing layer 52 are provided as being frame sequentially on the same surface of the substrate 50 for thermal transfer sheet. A thermal transfer sheet (see FIG. 3) in which the colorant layer 51 is provided on one surface of the substrate 50 for thermal transfer sheet and a thermal transfer sheet (not shown) in which the heat sealing layer 52 is provided on one surface of the substrate 50 for thermal transfer sheet may also be used in combination in place of the thermal transfer sheet in which the colorant layer 51 and the heat sealing layer 52 are provided as being frame sequentially.

(Substrate for Thermal Transfer Sheet)

The substrate 50 for thermal transfer sheet is provided in order to sustain the colorant layer 51 and the heat sealing layer 52 provided on one surface of the substrate 50 for thermal transfer sheet, and the back face layer optionally provided on the other surface of the substrate 1. The materials of the substrate 50 for thermal transfer sheet are not particularly limited. The materials desirably resist heat applied to the thermal transfer sheet when the thermal transferred image is formed on the receiving layer 4 of the intermediate transfer medium 10, and have trouble-free mechanical characteristics during manipulation. As the substrate 50 for thermal transfer sheet, for instance, various plastic films or sheets such as polyesters such as polyethylene terephthalate, polycarbonate, polyimide, polyether imide, cellulose derivatives, polyethylene, polypropylene, polystyrene, acryl, polyvinyl chloride, polyvinylidene chloride, nylon, polyether ether ketone can be exemplified. The thickness of the substrate 50 for thermal transfer sheet can be appropriately set depend on the materials such that the strength and heat resistance are suitable. The thickness is generally within the range of 2.5 µm or more and 50 µm or less. The substrate 1 of the intermediate transfer medium 10 according to one embodiment and the substrate 50 for thermal transfer sheet of the thermal transfer sheet 100 may be the same or may be different from each other.

(Colorant Layer)

The colorant layer 51 provided on one surface of the substrate 50 for thermal transfer sheet is a layer for forming the thermal transferred image on the receiving layer 4 of the intermediate transfer medium 10 using a sublimation type thermal transfer method. The sublimation type thermal transfer method is a method for applying an energy in accordance with image information from a heating device such as a thermal head, transferring the colorant component contained in the colorant layer 51 of the thermal transfer sheet 100 on the receiving layer 4 of the intermediate transfer medium 10 to form the thermal transferred image.

As the colorant component, a sublimable dye, a fluorescent dye, etc., can be exemplified.

As the sublimable dye, those having a sufficient color density and resistance to discoloration and fading due to light, heat, temperature and the like are preferred. As such a sublimable dye, for instance, diarylmethane-based dyes, triarylmethane-based dyes, thiazole-based dyes, merocyanine dyes, pyrazolone dyes, methine-based dyes, indoaniline-based dyes, pyrazolomethine-based dyes, azomethine-based dyes such as acetophenoneazomethine, pyrazoloazomethine, imidazoleazomethine, imidazoazomethine, and pyridoneazomethine, xanthene-based dyes, oxazine-based dyes, cyanostyrene-based dyes such as dicyanostyrene and tricyanostyrene, thiazine-based dyes, azine-based dyes, acridine-based dyes, benzeneazo-based dyes, azo-based dyes such as pyridoneazo, thiopheneazo, isothiazoleazo, pyrroleazo, pyrazoleazo, imidazoleazo, thiadiazoleazo, triazoleazo, and disazo, spiropyran-based dyes, indolinospiropyran-based dyes, fluoran-based dyes, rhodaminelactam-based dyes, naphthoquinone-based dyes, anthraquinone-based dyes, quinophthalone-based dyes, etc., can be exemplified. Specifically, red dyes such as MSRedG (manufactured by Mitsui Toatsu Chemicals Co., Ltd.), Macrolex Red Violet R (manufactured by Bayer AG), CeresRed 7B (manufactured by Bayer AG), and Samaron Red F3BS (manufactured by Mitsubishi Chemical Corporation), yellow dyes such as Foron Brilliant Yellow 6GL (manufactured by Clariant), PTY-52 (manufactured by Mitsubishi Chemical Corporation), and MACROLEX Yellow 6G (manufactured by Bayer AG), and blue dyes such as Kayaset (registered trademark) Blue 714 (manufactured by Nippon Kayaku Co., Ltd.), Foron Brilliant Blue S-R (manufactured by Clariant), MS Blue 100 (Mitsui Toatsu Chemicals Co., Ltd.), and C.I. Solvent Blue 63, etc., can be exemplified.

As the binder resin used for carrying the sublimable dye, those having heat resistance and having a moderate affinity with the sublimable dye are preferred. As such a binder resin, for instance, cellulosic resins such as nitro cellulose, cellulose acetate butyrate, and cellulose acetate propionate; vinyl type resins such as polyvinyl acetate, polyvinyl butyral, and polyvinyl acetal, acrylic resins such as poly (meth)acrylate and poly(meth)acrylamide; polyurethane type resins; polyamide type resins; polyester type resin, etc., can be exemplified.

As the fluorescent dye, for instance, diaminostilbenedisulfonic acid derivatives, imidazole derivatives, coumarin derivatives, derivatives of triazole, carbazole, pyridine, naphthalic acid, imidazolone or the like, dyes such as fluorescein and eosin, compounds having a benzene ring such as anthracene, etc., can be exemplified. The fluorescent dye has the characteristics that it is excited by sun light, electric light or ultraviolet rays and the like to absorb an energy and convert the energy into light during excitation to emit light (fluorescent light).

As the binder resin used for carrying the fluorescent dye, vinyl type resins such as polyvinyl acetate, polyvinyl butyral, and polyvinyl acetal, cellulosic resins, melamine type resins, polyester type resins, polyamide type resins, polyolefin type resins, polyurethane type resins, acrylic resins, styrene type resins, styrene-acrylic copolymers, ethylene-vinyl acetate copolymers, and thermoplastic elastomers such as chlorinated polypropylene, chlorinated rubber, and styrene-butadiene rubber can be exemplified.

Figure 5:
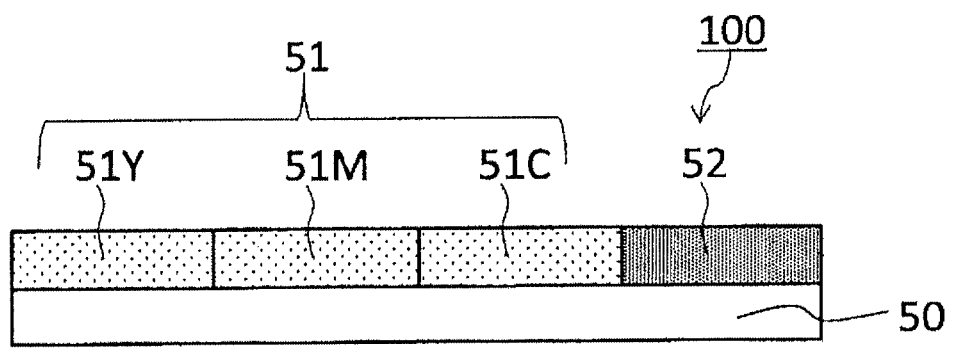
FIG. 5 is a schematic sectional view showing an example of a thermal transfer sheet.

The colorant layer 51 may include a single layer, or may include two or more layers. For instance, when the thermal transferred image formed on the receiving layer 4 of the intermediate transfer medium 10 is a monochromatic image, the colorant layer 51 may include a single colorant layer. When the thermal transferred image is a full-color image, as shown in FIG. 5, the colorant layer 51 may be formed by arranging a plurality of colorant layers (yellow colorant layer 51Y, magenta colorant layer 51M, cyan colorant layer 51C) each containing a sublimable dye having a different hue such as a yellow dye, a magenta dye, and a cyan dye on the same surface of the substrate 50 for thermal transfer sheet. The colorant layer 51 may be formed by arranging two of a plurality of colorant layers each containing a sublimable dye having a different hue such as a yellow dye, a magenta dye, and a cyan dye on the same surface of the substrate 50 for thermal transfer sheet. One of a thermal transfer sheet having only a yellow colorant layer 51Y, a thermal transfer sheet having only a magenta colorant layer 51M, and a thermal transfer sheet having only a cyan colorant layer 51C may be used solely, or two or more thereof may be used in combination. In place of, or together with the colorant layer, another colorant layer, for instance, a colorant layer containing a fluorescent dye can also be used. A colorant layer containing a sublimable dye, and a black thermally fusible ink layer, and the like may also be provided as being frame sequentially. A thermal transfer sheet having a colorant layer containing a sublimable dye, and a thermal transfer sheet having a black thermally fusible ink layer may be used in combination.

The contents of the binder resin, sublimable dye or fluorescent dye as the colorant component in the colorant layer are not particularly limited, and can be appropriately set according to an image density and the like required for a thermal transferred image 20 formed on the transfer layer 5 of the intermediate transfer medium 10 using the colorant layer 51.

The colorant layer 51 may contain additives such as inorganic particles and organic fine particles, in addition to the binder resin and the colorant component. As the inorganic particles, talc, carbon black, aluminum, molybdenum disulfide, etc., can be exemplified. As the organic fine particles, polyethylene wax, silicone resin fine particles, etc., can be exemplified. The colorant layer 51 as an example may contain a release agent. As the release agent, modified or non-modified silicone oils (including those called silicone resins), phosphoric esters, fatty acid esters, etc., can be exemplified.

For instance, the colorant layer 51 of the embodiment can be formed by dissolving or dispersing a binder resin, a colorant component, an additive added if necessary, and a release agent in a suitable solvent to prepare a coating liquid for colorant layer, coating the coating liquid on the substrate 50 for thermal transfer sheet, or on an optional layer provided on the substrate 50 for thermal transfer sheet, and drying the coating liquid. The thickness of the colorant layer 51 is generally within the range of 0.2 µm or more and 2.0 µm or less.

(Dye Primer Layer)

A dye primer layer intended to improve the adhesion between the substrate 50 for thermal transfer sheet and the colorant layer 51 may be provided between the substrate 50 for thermal transfer sheet and the colorant layer 51.

As the dye primer layer, dye primer layers conventionally known in the field of the thermal transfer sheet can be appropriately selected and used. The dye primer layer as an example contains a resin material. As the resin material constituting the dye primer layer, for instance, polyester type resins, polyvinyl pyrrolidone resins, polyvinyl alcohol resins, polyacrylic ester type resins, polyvinyl acetate type resins, polyurethane type resins, styrene acrylate type resins, polyacrylamide type resins, polyamide type resins, resins such as polyvinyl acetoacetal and polyvinyl butyral, etc., can be exemplified. The dye primer layer may also contain various additives such as organic particles and inorganic particles in addition to these resin components.

The method for forming the dye primer layer is not also particularly limited, and the dye primer layer may be formed by dispersing or dissolving the resin component exemplified as above and additives added if necessary in a suitable solvent to prepare a coating liquid for dye primer layer, coating the coating liquid on the substrate 50 for thermal transfer sheet, and drying the coating liquid. The thickness of the primer layer is not particularly limited, and is generally within the range of 0.02 µm or more and 1 µm or less.

(Heat Sealing Layer)

As shown in FIG. 4, the colorant layer 51 and the heat sealing layer 52 may also be provided as being frame sequentially on one surface of the substrate 50 for thermal transfer sheet.

The heat sealing layer 52 is provided so that it is able to be exfoliated from the substrate 50 for thermal transfer sheet, and is a layer transferred on the transfer layer 5 of the intermediate transfer medium according to one embodiment.

As described above, when the transfer layer 5 is transferred on the transfer receiving article 200 using the intermediate transfer medium 10 according to one embodiment, the receiving layer 4 located furthest from the substrate 1 among layers constituting the transfer layer 5, that is, the receiving layer 4 located on the outermost surface of the transfer layer 5 is brought into direct contact with the transfer receiving article 200. That is, the adhesiveness (may be referred to as adhesion) between the transfer receiving article 200 and the transfer layer 5 is determined by the adhesiveness of the receiving layer 4.

The adhesiveness of the receiving layer 4 is considered to have a close relation with the number average molecular weight (Mn) of the binder resin contained in the receiving layer 4 and the content of the release agent, and to tend to cause deteriorated adhesiveness as the number average molecular weight (Mn) of the binder resin contained in the receiving layer 4 is increased, or the content of the release agent is increased. As described above, the receiving layer 4 of the intermediate transfer medium 10 according to one embodiment contains the binder resin having a number average molecular weight (Mn) of 8000 or more and 32000 or less and 6% by mass or more of the release agent based on the total mass of the receiving layer 4, whereby, when the adhesiveness between the transfer receiving article 200 and the transfer layer 5 is intended to be further improved, it is preferable that the heat sealing layer 52 of the thermal transfer sheet 100 is transferred on the transfer layer 5, and the transfer layer 5 on which the heat sealing layer 52 is transferred is then transferred on the transfer receiving article 200. In other words, it is preferable that the transfer layer 5 is transferred on the transfer receiving article 200 with the transfer receiving article 200 and the heat sealing layer 52 brought into direct contact with each other. This does not mean that, when the transfer layer 5 of the intermediate transfer medium 10 according to one embodiment is transferred on the transfer receiving article 200 with the transfer receiving article 200 and the receiving layer 4 brought into direct contact with each other, the adhesiveness between the transfer receiving article 200 and the transfer layer 5 is insufficient. For instance, when the measures for improving the adhesiveness with the transfer layer 5 have been made on the transfer receiving article 200 side, or the print obtained by transferring the transfer layer 5 on the transfer receiving article 200 is not used under a severe environment, the adhesiveness between the transfer receiving article 200 and the transfer layer 5 can be sufficiently maintained with the transfer receiving article 200 and the receiving layer 4 brought into direct contact with each other even if the transfer layer 5 is transferred on the transfer receiving article 200.

As the binder resin contained in the heat sealing layer 52, for instance, ultraviolet absorbing agent copolymerizing resins, acrylic resins, vinyl chloride-vinyl acetate copolymers, epoxy resins, polyester resins, polycarbonate resins, butyral resins, polyamide resins, vinyl chloride resins, etc., can be exemplified. The heat sealing layer 52 may contain one binder resin solely, or may contain two or more binder resins.

The heat sealing layer 52 of a preferred embodiment contains a binder resin having a number average molecular weight (Mn) of 4000 or more and 32000 or less. The heat sealing layer 52 of a more preferred embodiment contains a binder resin having a smaller number average molecular weight (Mn) than that of the binder resin contained in the receiving layer. The heat sealing layer 52 of a still more preferred embodiment contains a binder resin satisfying a condition that the number average molecular weight (Mn) of the binder resin is smaller than that of the binder resin contained in the receiving layer and having a number average molecular weight (Mn) of 4000 or more, and particularly 4000 or more and 20000 or less. According to the heat sealing layer 52 of each of the preferred embodiments, the adhesiveness when the heat sealing layer 52 is transferred on the transfer layer 5 of the intermediate transfer medium 10, and the transfer layer 5 on which the heat sealing layer 52 is transferred is transferred on the transfer receiving article 200 can be further improved. When the number average molecular weight (Mn) of the binder resin contained in the heat sealing layer is too small, blocking tends to be apt to occur, and the storage stability of the thermal transferred image formed on the receiving layer 4 tends to be deteriorated. The number average molecular weight (Mn) of the binder resin contained in the receiving layer 4 used herein means the binder resin contained in the greatest amount among the binder resins each having a number average molecular weight (Mn) of 8000 or more and 32000 or less.

The method for forming the heat sealing layer 52 is not particularly limited, and the heat sealing layer may be formed by dispersing or dissolving a binder resin, and an ultraviolet absorbing agent, an antioxidant, a fluorescent brightener, an inorganic or organic filler component, a surfactant, a release agent, and the like added if necessary in a suitable solvent, to prepare a coating liquid for heat sealing layer, coating the coating liquid on the substrate 50 for thermal transfer sheet, and drying the coating liquid. The thickness of the heat sealing layer 52 is not particularly limited, and is preferably within the range of 0.5 μm or more and 10 μm or less, and more preferably within the range of 0.8 μm or more and 2 μm or less.

(Releasing Layer)

A releasing layer (not shown) for improving the transferring property of the heat sealing layer 52 may also be provided between the substrate 50 for thermal transfer sheet and the heat sealing layer 52. The releasing layer is a layer remaining on the side of the substrate for thermal transfer sheet when the heat sealing layer 52 is transferred on the transfer layer 5.

As the binder resin contained in the releasing layer, for instance, waxes, silicone waxes, silicone resins, silicone-modified resins, fluorine resins, modified fluorine resins, polyvinyl alcohols, acrylic resins, thermally cross-linkable epoxy-amino resins, thermally cross-linkable alkyd-amino resins, etc., can be exemplified. The releasing layer may be made of one resin, or two or more resins. The releasing layer may be formed by using cross-linking agents such as an isocyanate compound, a catalyst such as tin-based catalyst and an aluminum-based catalyst, in addition to the resins exemplified above and the resin having releasability. The thickness of the releasing layer is generally within the range of 0.2 μm or more and 5 μm or less. The releasing layer may be formed by dissolving or dispersing the above mentioned resin in a suitable solvent to prepare a coating liquid for releasing layer, coating the coating liquid on the substrate 50 for thermal transfer sheet, and drying the coating liquid.

(Back Face Layer)

The back face layer (not shown) may also be provided on the other surface of the substrate 50 for thermal transfer sheet.

The material of the back face layer is not limited, and for instance, single resins or mixtures of natural or synthetic resins such as cellulosic resins such as cellulose acetate butyrate and cellulose acetate propionate; vinyl type resins such as polyvinyl butyral and polyvinyl acetal; acrylic resins such as polymethyl methacrylate, polyethyl acrylate, polyacrylamide, and an acrylonitrile-styrene copolymer; polyamide resins; polyamide imide resins; polyester type resins; polyurethane resins, and silicone-modified or fluorine-modified urethanes, etc., can be exemplified.

The back face layer may also contain a solid or liquid lubricant. As the lubricant, for instance, various waxes such as polyethylene wax and paraffin wax, higher aliphatic alcohols, organo polysiloxanes, anionic surfactants, cationic surfactants, amphoteric surfactants, nonionic surfactants, fluorine type surfactants, organic carboxylic acids and derivatives thereof, metal soaps, fluorine type resins, silicone type resins, and fine particles of inorganic compounds such as talc and silica, etc., can be exemplified. The mass of the lubricant based on the total mass of the back face layer is within the range of 5% by mass or more and 50% by mass or less, and preferably within the range of 10% by mass or more and 40% by mass or less.

The method for forming the back face layer is not particularly limited, and the back face layer may be formed by dissolving or dispersing a resin, a lubricant added if necessary and the like in a suitable solvent to prepare a coating liquid for back surface layer, coating the coating liquid on the substrate 50 for thermal transfer sheet, and drying the coating liquid. The thickness of the back face layer is preferably within the range of 1 μm or more and 10 μm or less.

<<Method for Forming Print>>

Subsequently, a method for forming a print according to an embodiment of the present disclosure will be described. The method for forming a print according to the embodiment of the present disclosure (hereinafter, referred to as a method for forming a print according to one embodiment) includes: an intermediate transfer medium preparing step of preparing the intermediate transfer medium 10 having the transfer layer 5; a thermal transfer sheet preparing step of preparing (i) a combination of a thermal transfer sheet (see FIG. 3) having the colorant layer 51 and a thermal transfer sheet (not shown) having the heat sealing layer 52 or (ii) a thermal transfer sheet (see FIG. 4 and FIG. 5) having the colorant layer 51 and the heat sealing layer 52 provided as being frame sequentially; a transfer receiving article preparing step of preparing the transfer receiving article 200; a thermal transferred image forming step (see FIG. 6(*a*)) of combining the intermediate transfer medium 10 with the thermal transfer sheet 100, and forming the thermal transferred image 20 on the transfer layer 5 of the intermediate transfer medium 10 using the colorant layer 51 of the thermal transfer sheet 100; a heat sealing layer transferring step (see FIG. 6(*b*)) of transferring the heat sealing layer 52 of the thermal transfer sheet 100 on the transfer layer 5 on which the thermal transferred image 20 is formed; and a transfer foil transferring step (see FIG. 6(*c*)) of transferring a transfer foil 60 obtained by laminating the transfer layer 5 on which the thermal transferred image 20 is formed, and the heat sealing layer 52 in this order from the first substrate (1) side on the transfer receiving article 200, wherein in the intermediate transfer medium preparing step, prepared is the intermediate transfer medium 10 in which: the transfer layer 5 has a single layer structure including only the receiving layer 4 or a layered structure in which the receiving layer 4 is located furthest from the first substrate (1); the receiving layer contains a binder resin having a number average molecular weight (Mn) of 8000 or more and 32000 or less and a release agent; and the content of the release agent based on the total mass of the receiving layer 4 is 6% by mass or more.

Figure 6A:
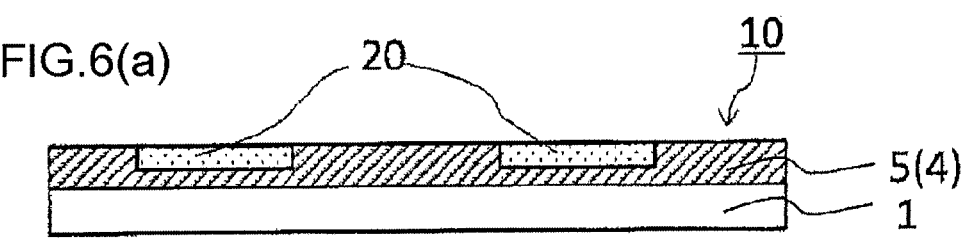
FIG. 6 is a process chart for describing a method for forming a print according to one embodiment, and FIGS. 6(*a*) to 6(*c*) are schematic sectional views.
Figure 6B:
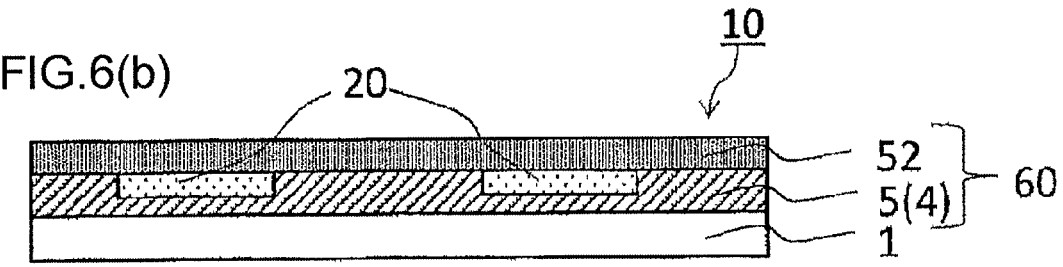

A method for forming a print as an example includes: an intermediate transfer medium preparing step of preparing the intermediate transfer medium 10 (see FIG. 1 and FIG. 2) in which the transfer layer 5 is provided on the first substrate (1); a thermal transfer sheet preparing step of preparing the thermal transfer sheet 100 (see FIG. 4 and FIG. 5) in which the colorant layer 51 and a heat sealing layer 52 are as being frame sequentially on one surface of a second substrate (50); a transfer receiving article preparing step of preparing the transfer receiving article 200; a thermal transferred image forming step (see FIG. 6(a)) of combining the intermediate transfer medium 10 with the thermal transfer sheet 100, and forming the thermal transferred image 20 on the transfer layer 5 of the intermediate transfer medium 10 using the colorant layer 51 of the thermal transfer sheet 100; a heat sealing layer transferring step (see FIG. 6(b)) of transferring the heat sealing layer 52 of the thermal transfer sheet 100 on the transfer layer 5 on which the thermal transferred image 20 is formed; and a transfer foil transferring step (see FIG. 6 (c)) of transferring the transfer foil 60 obtained by laminating the transfer layer 5 on which the thermal transferred image 20 is formed, and the heat sealing layer 52 in this order from the first substrate (1) side on the transfer receiving article 200, wherein in the intermediate transfer medium preparing step, prepared is the intermediate transfer medium 10 in which: the transfer layer 5 has a single layer structure including only the receiving layer 4 or a layered structure in which the receiving layer 4 is located furthest from the first substrate (1); the receiving layer contains a binder resin having a number average molecular weight (Mn) of 8000 or more and 32000 or less and a release agent; and the content of the release agent based on the total mass of the receiving layer 4 is 6% by mass or more.

The method for forming a print according to one embodiment can form the high-density thermal transferred image 20 on the receiving layer 4 constituting the transfer layer 5 while suppressing the occurrence of printing unevenness. The method for forming a print can transfer the transfer layer on which the thermal transferred image 20 is formed on the transfer receiving article 200 with good foil cutting properties.

Furthermore, the method for forming a print can provide a print 300 having high adhesiveness between the transfer receiving article 200 and the transfer layer 5. Hereinafter, steps of the method for forming a print according to one embodiment will be described.

<Intermediate Transfer Medium Preparing Step>

The intermediate transfer medium preparing step is a step of preparing the intermediate transfer medium 10 in which the transfer layer 5 is provided on the first substrate (1) as shown in FIG. 1 and FIG. 2. As one of features in the method for forming a print according to one embodiment, the transfer layer 5 of the intermediate transfer medium 10 prepared in the step has a single layer structure including only the receiving layer 4 or a layered structure in which the receiving layer 4 is located furthest from the first substrate (1); the receiving layer 4 contains the binder resin having a number average molecular weight (Mn) of 8000 or more and 32000 or less and the release agent; and the content of the release agent based on the total mass of the receiving layer 4 is 6% by mass or more. The method for forming a print according to one embodiment having the feature can form the high-density thermal transferred image 20 on the receiving layer 4 constituting the transfer layer 5 while suppressing the occurrence of printing unevenness in the thermal transferred image forming step described later. The method for forming a print according to one embodiment can provide good foil cutting properties of the transfer layer 5 when the transfer layer 5 on which the thermal transferred image 20 is formed is transferred. Particularly, the method for forming a print according to one embodiment can form the high-density thermal transferred image while suppressing the occurrence of printing unevenness even if a thermal energy when the thermal transferred image 20 is formed is increased.

As the intermediate transfer medium 10 prepared in the step, one described as the intermediate transfer medium 10 according to one embodiment can be used as it is, and a detailed description therefor is omitted here.

<Thermal Transfer Sheet Preparing Step>

The thermal transfer sheet preparing step is a step of preparing (i) a combination of the thermal transfer sheet (see FIG. 3) having the colorant layer 51 and the thermal transfer sheet (not shown) having the heat sealing layer 52 or (ii) the thermal transfer sheet (see FIG. 4 and FIG. 5) having the colorant layer 51 and the heat sealing layer 52 provided as being frame sequentially. As the thermal transfer sheet 100 prepared in the step, one described as the thermal transfer sheet used when the thermal transferred image is formed on the receiving layer 4 of the intermediate transfer medium 10 according to one embodiment can be appropriately selected and used, and a detailed description therefor is omitted here. The heat sealing layer 52 of the thermal transfer sheet 100 preferably contains the binder resin having a number average molecular weight (Mn) of 4000 or more and less than 32000, and particularly 4000 or more and 20000 or less. The heat sealing layer 52 more preferably contains the binder resin satisfying the condition of the number average molecular weight (Mn) being smaller than that of the binder resin contained in the receiving layer, and having a number average molecular weight (Mn) of 4000 or more, and particularly 4000 or more and 20000 or less.

<Transfer Receiving Article Preparing Step>

The transfer receiving article prepared in the step is not limited at all. For instance, plain paper, high-quality paper, tracing paper, a plastic film, a plastic card mainly composed of vinyl chloride, a vinyl chloride-vinyl acetate copolymer, polycarbonate, etc., can be exemplified. One having a predetermined image can also be used as the transfer receiving article. By using the transfer receiving article having transparency as the transfer receiving article 200, the thermal transferred image formed in the thermal transferred image forming step can be visually recognized from the surface and back face sides of the print 300 finally formed.

Figure 6C:
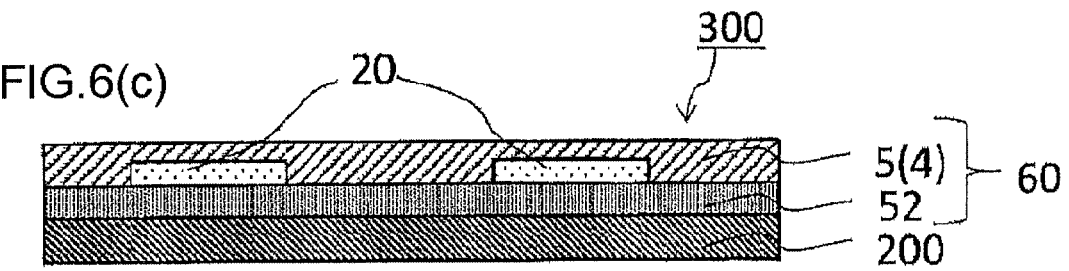

Subsequently, the step of forming the print 300 using the intermediate transfer medium 10, the thermal transfer sheet 100, and the transfer receiving article 200 prepared above will be specifically described with reference to FIG. 6. FIG. 6 is a process chart for describing the method for forming a print according to one embodiment, and FIGS. 6(a) to 6(c) are schematic sectional views.

<Thermal Transferred Image Forming Step>

The step is a step of superposing the intermediate transfer medium 10 and the thermal transfer sheet 100 prepared above so that the transfer layer 5 of the intermediate transfer medium 10 and the colorant layer 51 of the thermal transfer sheet 100 face each other, and forming the thermal transferred image 20 on the transfer layer 5, as shown in FIG. 6(a), using a heating device such as a thermal head. In FIG. 6, the intermediate transfer medium in which the transfer layer 5 having the single layer structure including only the receiving layer 4 is provided on the first substrate (1) is used as the intermediate transfer medium 10. The intermediate transfer medium 10 having the transfer layer 5 having the layered structure as shown in FIG. 2 can also be used.

<Heat Sealing Layer Transferring Step>

The step is a step of superposing the transfer layer 5 of the intermediate transfer medium 10 (the transfer layer 5 on which the thermal transferred image 20 is formed), and the heat sealing layer 52 of the thermal transfer sheet 100 so that the transfer layer 5 of the intermediate transfer medium 10 and the heat sealing layer 52 of the thermal transfer sheet 100 face each other after the thermal transferred image forming step, and transferring the heat sealing layer 52 on the transfer layer 5 on which the thermal transferred image 20 is formed, as shown in FIG. 6(b), using a heating device such as a thermal head. The method for transferring the heat sealing layer 52 is not particularly limited. In addition to methods in which a heating device such as a thermal head is used, for instance, a hot stamping method, a heat roll method, and the like may be used. The heat sealing layer 52 can also be transferred by methods other than these. The same applies to the case where the transfer foil 60 is transferred on the transfer receiving article 200 in the transfer foil transferring step.

<Transfer Foil Transferring Step>

The step is a step of superposing the transfer receiving article 200 prepared above and the heat sealing layer 52 transferred on the intermediate transfer medium 10 so that the transfer receiving article 200 and the heat sealing layer 52 face each other as shown in FIG. 6(c), and transferring the transfer foil 60 obtained by transferring the heat sealing layer 52 on the transfer layer 5 on which the thermal transferred image 20 is formed on the transfer receiving article 200. The step provides the print 300 obtained by transferring the transfer layer 5 on which the thermal transferred image 20 is formed on the transfer receiving article 200 with the heat sealing layer 52 interposed therebetween. In the method for forming a print according to one embodiment, in the heat sealing layer transferring step, the heat sealing layer 52 is transferred on the transfer layer 5 on which the thermal transferred image 20 is formed, and the transfer layer 5 is transferred on the transfer receiving article 200 with the heat sealing layer 52 interposed therebetween, which can provide extremely good adhesiveness between the transfer receiving article 200 and the transfer layer 5 on which the thermal transferred image 20 is formed.

In the method for forming a print according to one embodiment described above, the step of transferring the heat sealing layer 52 on the transfer layer 5 on which the thermal transferred image 20 is formed is essential. The print 300 can also be formed by transferring the transfer layer 5 on which the thermal transferred image is formed on the transfer receiving article 200 in a state where the transfer receiving article 200 and the receiving layer 4 are brought into direct contact with each other without performing the heat sealing layer transferring step as a method for forming a print according to other embodiment. Hereinafter, the method for forming a print according to other embodiment will be described.

<<Method for Forming Print According to Other Embodiment>>

The method for forming a print according to other embodiment includes an intermediate transfer medium preparing step of preparing the intermediate transfer medium 10 (see FIG. 1 and FIG. 2) having the transfer layer 5, a thermal transfer sheet preparing step of preparing the thermal transfer sheet 100 (see FIG. 3) having the colorant layer 51, a transfer receiving article preparing step of preparing the transfer receiving article 200, a thermal transferred image forming step of combining the intermediate transfer medium 10 with the thermal transfer sheet 100 and forming the thermal transferred image 20 on the transfer layer 5 of the intermediate transfer medium 10 using the colorant layer 51 of the thermal transfer sheet 100, and a transferring step of combining the intermediate transfer medium 10 having the transfer layer 5 on which the thermal transferred image 20 is formed with the transfer receiving article, and transferring the transfer layer 5 on which the thermal transferred image 20 is formed on the transfer receiving article 200, wherein in the intermediate transfer medium preparing step, prepared is the intermediate transfer medium 10 in which: the transfer layer 5 has a single layer structure including only the receiving layer 4, or a layered structure in which the receiving layer 4 is located on the outermost surface of the transfer layer 5; the receiving layer contains a binder resin having a number average molecular weight (Mn) of 8000 or more and 32000 or less and a release agent; and the content of the release agent based on the total mass of the receiving layer 4 is 6% by mass or more.

In the method for forming a print according to one embodiment, the thermal transfer sheet 100 used in the method for forming a print is (i) a combination of the thermal transfer sheet (see FIG. 3) having the colorant layer 51 and the thermal transfer sheet (not shown) having the heat sealing layer 52, or (ii) the thermal transfer sheet (see FIG. 4 and FIG. 5) having the colorant layer 51 and the heat sealing layer 52 provided as being frame sequentially. By contrast, in the method for forming a print according to other embodiment, the heat sealing layer 52 is not essential but the thermal transfer sheet (see FIG. 3) having the colorant layer 51 is used. In this point, the method for forming a print according to other embodiment is different from the method for forming a print according to one embodiment. According to this difference, the method for forming a print according to other embodiment is different from the method for forming a print according to one embodiment in a point where the heat sealing layer transferring step in the method for forming a print according to one embodiment is not essential, or in a point where the transfer layer 5 on which the thermal transferred image 20 is formed is transferred on the transfer receiving article 200 without interposing the heat sealing layer. The method for forming a print according to other embodiment is different from the method for forming a print according to one embodiment in the point, and other points are common in the methods.

The method for forming a print according to other embodiment can form the high-density thermal transferred image 20 on the receiving layer 4 constituting the transfer layer 5 while suppressing the occurrence of printing unevenness. The transfer layer 5 on which the thermal transferred image 20 is formed can be transferred on the transfer receiving article 200 with good foil cutting properties.

<<Combination of Intermediate Transfer Medium and Thermal Transfer Sheet>>

Subsequently, the combination of the intermediate transfer medium and the thermal transfer sheet according to the embodiment of the present disclosure will be described. The combination of the intermediate transfer medium and the thermal transfer sheet according to the embodiment of the present disclosure (hereinafter referred to as the combination according to one embodiment) is the combination of the intermediate transfer medium and the thermal transfer sheet described in the method for forming a print according to one embodiment.

Therefore, regarding the intermediate transfer medium and the thermal transfer sheet constituting the combination according to one embodiment, the intermediate transfer medium according to one embodiment, and the intermediate transfer medium and the thermal transfer sheet described in the method for forming a print according to one embodiment can be used as it is, and detailed descriptions therefor are omitted here.

The combination according to one embodiment can form the high-density thermal transferred image 20 on the receiving layer 4 constituting the transfer layer 5 while suppressing the occurrence of printing unevenness. The combination according to one embodiment can transfer the transfer layer on which the thermal transferred image 20 is formed on the transfer receiving article 200 with good foil cutting properties. Furthermore, the combination according to one embodiment can provide the print 300 having high adhesiveness between the transfer receiving article 200 and the transfer layer 5.

In a combination according to one preferred embodiment, a heat sealing layer of a thermal transfer sheet contains a binder resin having a number average molecular weight (Mn) of 4000 or more and 32000 or less. More preferably, a heat sealing layer of a thermal transfer sheet contains a binder resin which has a smaller number average molecular weight (Mn) than that of the binder resin having a number average molecular weight (Mn) of 8000 or more and 32000 or less and contained in the receiving layer of the intermediate transfer medium, and has a number average molecular weight (Mn) of 4000 or more.

EXAMPLES

Example 1

Using a polyethylene terephthalate film of 16 μm in thickness as a substrate, a coating liquid for exfoliate layer having the following composition was coated on the substrate so that the dry thickness of the coating liquid for exfoliate layer was set to 1 μm, and dried, thereby forming an exfoliate layer. Then, a coating liquid for protective layer having the following composition was coated on the exfoliate layer so that the dry thickness of the coating liquid for protective layer was set to 2 μm, and dried, thereby forming a protective layer. Then, a coating liquid for receiving layer 1 having the following composition was coated on the protective layer so that the dry thickness of the coating liquid for receiving layer 1 was set to 1.5 μm, and dried to form a receiving layer, thereby obtaining an intermediate transfer medium in which the exfoliate layer, the protective layer, and the receiving layer were laminated in this order on the substrate. The exfoliate layer, the protective layer, and the receiving layer are layers constituting a transfer layer.

| <Coating liquid for exfoliate layer> | |
| --- | --- |
| Acrylic resin (Diyanal (registered trademark) BR-87, manufactured by Mitsubishi Rayon Co., Ltd.) | 29 parts |
| Polyester resin (Vylon (registered trademark) 200, manufactured by TOYOBO Co., Ltd.) | 1 part |
| Methyl ethyl ketone | 35 parts |
| Toluene | 35 parts |

| <Coating liquid for protective layer> | |
| --- | --- |
| Polyester resin (Vylon (registered trademark) 200, manufactured by TOYOBO Co., Ltd.) | 30 parts |
| Methyl ethyl ketone | 35 parts |
| Toluene | 35 parts |

| <Coating liquid for receiving layer 1> | |
| --- | --- |
| Vinyl chloride - vinyl acetate copolymer (Mn: 12000) (SOLBIN (registered trademark) CNL, manufactured by Nissin Chemical Industry Co., Ltd.) | 17.6 parts |
| Silicone oil (X-22-3000T, manufactured by Shin-Etsu Chemical Co., Ltd.) | 2.4 parts |
| Methyl ethyl ketone | 40 parts |
| Toluene | 40 parts |

Example 2

An intermediate transfer medium of Example 2 was obtained totally in the same manner as in Example 1 except that the coating liquid for receiving layer 1 was replaced with a coating liquid for receiving layer 2 having the following composition to form a receiving layer.

| <Coating liquid for receiving layer 2> | |
| --- | --- |
| Vinyl chloride - vinyl acetate copolymer (Mn: 31000) (SOLBIN (registered trademark) C, manufactured by Nissin Chemical Industry Co., Ltd.) | 17.6 parts |
| Silicone oil (X-22-3000T, manufactured by Shin-Etsu Chemical Co., Ltd.) | 2.4 parts |
| Methyl ethyl ketone | 40 parts |
| Toluene | 40 parts |

Example 3

An intermediate transfer medium of Example 3 was obtained totally in the same manner as in Example 1 except that the coating liquid for receiving layer 1 was replaced with a coating liquid for receiving layer 3 having the following composition to form a receiving layer.

| <Coating liquid for receiving layer 3> | |
| --- | --- |
| Vinyl chloride - vinyl acetate copolymer (Mn: 31000) (SOLBIN (registered trademark) C, manufactured by Nissin Chemical Industry Co., Ltd.) | 18.4 parts |
| Silicone oil (X-22-3000T, manufactured by Shin-Etsu Chemical Co., Ltd.) | 1.6 parts |
| Methyl ethyl ketone | 40 parts |
| Toluene | 40 parts |

Example 4

An intermediate transfer medium of Example 4 was obtained totally in the same manner as in Example 1 except that the coating liquid for receiving layer 1 was replaced with a coating liquid for receiving layer 4 having the following composition to form a receiving layer.

| <Coating liquid for receiving layer 4> | |
|---|---|
| Vinyl chloride - vinyl acetate copolymer (Mn: 12000) (SOLBIN (registered trademark) CNL, manufactured by Nissin Chemical Industry Co., Ltd.) | 15 parts |
| Silicone oil (X-22-3000T, manufactured by Shin-Etsu Chemical Co., Ltd.) | 5 parts |
| Methyl ethyl ketone | 40 parts |
| Toluene | 40 parts |

Example 5

An intermediate transfer medium of Example 5 was obtained totally in the same manner as in Example 1 except that the coating liquid for receiving layer 1 was replaced with a coating liquid for receiving layer 5 having the following composition to form a receiving layer.

| <Coating liquid for receiving layer 5> | |
|---|---|
| Polyester resin (Mn: 10000) (Vylon (registered trademark) GK250, manufactured by TOYOBO Co., Ltd.) | 17.6 parts |
| Silicone oil (X-22-3000T, manufactured by Shin-Etsu Chemical Co., Ltd.) | 2.4 parts |
| Methyl ethyl ketone | 40 parts |
| Toluene | 40 parts |

Example 6

An intermediate transfer medium of Example 6 was obtained totally in the same manner as in Example 1 except that the coating liquid for receiving layer 1 was replaced with a coating liquid for receiving layer 6 having the following composition to form a receiving layer.

| <Coating liquid for receiving layer 6> | |
|---|---|
| Vinyl chloride - vinyl acetate copolymer (Mn: 12000) (SOLBIN (registered trademark) CNL, manufactured by Nissin Chemical Industry Co., Ltd.) | 9.6 parts |
| Polyester resin (Mn: 6000) (Vylon (registered trademark) GK810, manufactured by TOYOBO Co., Ltd.) | 8 parts |
| Silicone oil (X-22-3000T, manufactured by Shin-Etsu Chemical Co., Ltd.) | 2.4 parts |
| Methyl ethyl ketone | 40 parts |
| Toluene | 40 parts |

Example 7

An intermediate transfer medium of Example 7 was obtained totally in the same manner as in Example 1 except that the coating liquid for receiving layer 1 was replaced with a coating liquid for receiving layer 7 having the following composition to form a receiving layer.

| <Coating liquid for receiving layer 7> | |
|---|---|
| Polyvinyl butyral resin (Mn: 27000) (S-LEC (registered trademark) BL-2, manufactured by Sekisui Chemical Co., Ltd.) | 18.4 parts |

-continued

| <Coating liquid for receiving layer 7> | |
|---|---|
| Silicone oil (X-22-3000T, manufactured by Shin-Etsu Chemical Co., Ltd.) | 1.6 parts |
| Methyl ethyl ketone | 40 parts |
| Toluene | 40 parts |

Comparative Example 1

An intermediate transfer medium of Comparative Example 1 was obtained totally in the same manner as in Example 1 except that the coating liquid for receiving layer 1 was replaced with a coating liquid for receiving layer A having the following composition to form a receiving layer.

| <Coating liquid for receiving layer A> | |
|---|---|
| Vinyl chloride - vinyl acetate copolymer (Mn: 42000) (SOLBIN (registered trademark) CN, manufactured by Nissin Chemical Industry Co., Ltd.) | 19.4 parts |
| Silicone oil (X-22-3000T, manufactured by Shin-Etsu Chemical Co., Ltd.) | 0.6 part |
| Methyl ethyl ketone | 40 parts |
| Toluene | 40 parts |

Comparative Example 2

An intermediate transfer medium of Comparative Example 2 was obtained totally in the same manner as in Example 1 except that the coating liquid for receiving layer 1 was replaced with a coating liquid for receiving layer B having the following composition to form a receiving layer.

| <Coating liquid for receiving layer B> | |
|---|---|
| Polyester resin (Mn: 6000) (Vylon (registered trademark) GK810, manufactured by TOYOBO Co., Ltd.) | 19.4 parts |
| Silicone oil (X-22-3000T, manufactured by Shin-Etsu Chemical Co., Ltd.) | 0.6 part |
| Methyl ethyl ketone | 40 parts |
| Toluene | 40 parts |

Comparative Example 3

An intermediate transfer medium of Comparative Example 3 was obtained totally in the same manner as in Example 1 except that the coating liquid for receiving layer 1 was replaced with a coating liquid for receiving layer C having the following composition to form a receiving layer.

| <Coating liquid for receiving layer C> | |
|---|---|
| Vinyl chloride - vinyl acetate copolymer (Mn: 12000) (SOLBIN (registered trademark) CNL, manufactured by Nissin Chemical Industry Co., Ltd.) | 19.4 parts |
| Silicone oil (X-22-3000T, manufactured by Shin-Etsu Chemical Co., Ltd.) | 0.6 part |
| Methyl ethyl ketone | 40 parts |
| Toluene | 40 parts |

Comparative Example 4

An intermediate transfer medium of Comparative Example 4 was obtained totally in the same manner as in Example 1 except that the coating liquid for receiving layer 1 was replaced with a coating liquid for receiving layer D having the following composition to form a receiving layer.

| <Coating liquid for receiving layer D> | |
|---|---|
| Vinyl chloride - vinyl acetate copolymer (Mn: 42000) (SOLBIN (registered trademark) CN, manufactured by Nissin Chemical Industry Co., Ltd.) | 18.4 parts |
| Silicone oil (X-22-3000T, manufactured by Shin-Etsu Chemical Co., Ltd.) | 1.6 parts |
| Methyl ethyl ketone | 40 parts |
| Toluene | 40 parts |

Comparative Example 5

An intermediate transfer medium of Comparative Example 5 was obtained totally in the same manner as in Example 1 except that the coating liquid for receiving layer 1 was replaced with a coating liquid for receiving layer E having the following composition to form a receiving layer.

| <Coating liquid for receiving layer E> | |
|---|---|
| Polyester resin (Mn: 6000) (Vylon (registered trademark) GK810, manufactured by TOYOBO Co., Ltd.) | 18.4 parts |
| Silicone oil (X-22-3000T, manufactured by Shin-Etsu Chemical Co., Ltd.) | 1.6 parts |
| Methyl ethyl ketone | 40 parts |
| Toluene | 40 parts |

(Preparation of Thermal Transfer Sheet 1)

As a substrate, a polyethylene terephthalate film with easy-adhesion layer which had 5.0 μm in thickness was used. A coating liquid for yellow colorant layer, a coating liquid for magenta colorant layer, and a coating liquid for cyan colorant layer which had the following compositions were coated as being frame sequentially on the easy-adhesion layer side of the substrate so that the dry thicknesses of the coating liquids were set to 0.5 μm, and dried to form each of the colorant layers, thereby obtaining a thermal transfer sheet 1.

| <Coating liquid for yellow colorant layer> | |
|---|---|
| Solvent Yellow 93 | 5 parts |
| Polyvinyl acetoacetal resin (KS-5, manufactured by Sekisui Chemical Co., Ltd.) | 4 parts |
| Toluene | 50 parts |
| Methyl ethyl ketone | 50 parts |

| <Coating liquid for magenta colorant layer> | |
|---|---|
| Disperse Red 60 | 3 parts |
| Disperse Violet 26 | 3 parts |
| Magenta dye (HSR-2150, manufactured by Mitsubishi Chemical Corporation) | 2 parts |
| Polyvinyl acetoacetal resin (KS-5, manufactured by Sekisui Chemical Co., Ltd.) | 5 parts |
| Toluene | 50 parts |
| Methyl ethyl ketone | 50 parts |

| <Coating liquid for cyan colorant layer> | |
|---|---|
| Solvent Blue 63 | 3 parts |
| Disperse Blue 354 | 2.5 parts |
| Polyvinyl acetoacetal resin (KS-5, manufactured by Sekisui Chemical Co., Ltd.) | 5 parts |
| Toluene | 50 parts |
| Methyl ethyl ketone | 50 parts |

(Preparation of Thermal Transfer Sheet 2)

A thermal transfer sheet 2 in which each of colorant layers and a heat sealing layer were provided as being frame sequentially on a substrate was obtained totally in the same preparation manner as in the thermal transfer sheet 1 except that a coating liquid for heat sealing layer having the following composition was coated on the thermal transfer sheet 1 obtained as described above so that the dry thickness of the coating liquid for heat sealing layer was set to 1 μm, and dried to form a heat sealing layer.

| <Coating liquid for heat sealing layer> | |
|---|---|
| Vinyl chloride - vinyl acetate copolymer (Mn: 12000) (SOLBIN (registered trademark) CNL, manufactured by Nissin Chemical Industry Co., Ltd.) | 20 parts |
| Methyl ethyl ketone | 40 parts |
| Toluene | 40 parts |

(Formation of Thermal Transferred Image)

The intermediate transfer medium of each of Examples and Comparative Examples was combined with the thermal transfer sheet 1 prepared by the above mentioned procedure, and an energy was applied to the combination according to an image pattern by the following printer, thereby forming a black solid image (0/255 gradations) on the transfer layer (receiving layer) of the intermediate transfer medium. The transfer layer on which the thermal transferred image was formed is taken as a transfer foil (1).

(Printer)
Thermal head: KEE-57-12GAN2-STA (manufactured by KYOCERA Corporation)
Heater average resistance value: 3303 (Ω)
Main scanning direction printing density: 300 (dpi)
Sub scanning direction printing density: 300 (dpi)
Line cycle: 2.0 (msec./line)
Printing start temperature: 35 (° C.)
Pulse-Duty ratio: 85(%)
Applied voltage: 21.0 (V)

(Transfer of Heat Sealing Layer)

The intermediate transfer medium of each of Examples and Comparative Examples was combined with the thermal transfer sheet 2 prepared by the above mentioned procedure, and a black solid image was formed on the transfer layer (receiving layer) of the intermediate transfer medium under the same condition as that of the thermal transferred image. Then, using the printer, an energy equivalent to a black solid image (0/255 gradations) was applied to the thermal transfer sheet 2, thereby transferring the heat sealing layer of the thermal transfer sheet 2 on the transfer layer on which the black solid image was formed. A laminated body including the transfer layer on which the thermal transferred image was formed and the heat sealing layer is taken as a transfer foil (2).

(Transfer of Transfer Foil)

Using a card laminating machine (manufactured by SIP), a print of each of Examples and Comparative Examples in which the transfer receiving article and the receiving layer were brought into direct contact with each other was obtained by transferring the transfer foil (1) of the intermediate transfer medium on a polyvinyl chloride card (PVC card) (manufactured by Dai Nippon Printing Co., Ltd.) as a transfer receiving article under conditions of 180° C. and 2 inches/sec. A print of each of Examples and Comparative Examples in which the transfer receiving article and the receiving layer were brought into indirect contact with each other with the heat sealing layer interposed therebetween was obtained by transferring the transfer foil (2) of the intermediate transfer medium on the transfer receiving article using the same method as that in the transfer of the transfer foil (1).

(Evaluation of Density)

The reflection density of the thermal transferred image (black solid image) included in the print of each of Examples and Comparative Examples formed by using the thermal transfer sheet 1 was measured, and evaluated based on the following evaluation criteria. The reflection density was measured with a reflection densitometer (RD-918, manufactured by X-Rite, Inc.). The evaluation results are shown in Table 1.

transfer sheet 1 was visually confirmed, and evaluated based on the following evaluation criteria. The evaluation results are also shown in Table 1.

"Evaluation Criteria"

A: Printing unevenness is not confirmed.
B: Inconspicuous printing unevenness slightly occurs.
C: Conspicuous printing unevenness occurs.
NG: Considerably conspicuous printing unevenness occurs.

(Evaluation of Foil Cutting Properties)

The tailing state of an edge of the print of each of Examples and Comparative Examples formed by using the thermal transfer sheet 1 was confirmed, and the foil cutting properties were evaluated based on the following evaluation criteria. The evaluation results are shown in Table 1.

"Evaluation Criteria"

A: No tailing occurs.
B: The length of tailing is 0.2 mm or less.
C: The length of tailing is more than 0.2 mm and less than 1.0 mm.
NG: The length of tailing is 1.0 mm or more.

(Evaluation of Transferring Property)

The print of each of Examples and Comparative Examples obtained by transferring the transfer foil (1) and the transfer foil (2) was visually confirmed, and the transferring property was evaluated based on the following evaluation criteria. The evaluation results are also shown in Table 1.

"Evaluation Criteria"

A: The transfer foil is completely transferred.
B: A non-transfer part slightly occurs in the transfer foil.
C: A non-transfer part occurs in a large part of the transfer foil.

TABLE 1

| | Receiving layer | | | | | Transferring property | |
|---|---|---|---|---|---|---|---|
| | Content of release agent (%) | Binder resin/Mn | Density | Printing unevenness | Foil cutting properties | Transfer foil (1), Absence of heat sealing layer | Transfer foil (2), Presence of heat sealing layer |
| Example 1 | 12 | Vinyl chloride - vinyl acetate copolymer/12000 | A | B | A | A | A |
| Example 2 | 12 | Vinyl chloride - vinyl acetate copolymer/31000 | B | A | B | B | A |
| Example 3 | 8 | Vinyl chloride - vinyl acetate copolymer/31000 | B | A | B | B | A |
| Example 4 | 25 | Vinyl chloride - vinyl acetate copolymer/12000 | A | A | A | C | A |
| Example 5 | 12 | Polyester/10000 | B | C | A | A | A |
| Example 6 | 12 | Vinyl chloride - vinyl acetate copolymer/12000 Polyester/6000 | B | C | A | A | A |
| Example 7 | 8 | Butyral/27000 | C | C | B | C | A |
| Comparative Example 1 | 3 | Vinyl chloride - vinyl acetate copolymer/42000 | NG | C | NG | B | A |
| Comparative Example 2 | 3 | Polyester/6000 | C | NG | A | A | A |
| Comparative Example 3 | 3 | Vinyl chloride - vinyl acetate copolymer/12000 | C | NG | A | A | A |
| Comparative Example 4 | 8 | Vinyl chloride - vinyl acetate copolymer/42000 | NG | A | NG | B | A |
| Comparative Example 5 | 8 | Polyester/6000 | C | NG | A | A | A |

"Evaluation Criteria"

A: Black reflection density is 1.85 or more.
B: Black reflection density is 1.70 or more and less than 1.85.
C: Black reflection density is 1.60 or more and less than 1.70.
NG: Black reflection density is less than 1.60.

(Evaluation of Printing Unevenness)

The printing unevenness of the print of each of Examples and Comparative Examples formed by using the thermal

EXPLANATION OF THE NUMERALS

10 Intermediate transfer medium
1 Substrate, First substrate
5 Transfer layer
100 Thermal transfer sheet
50 Substrate for thermal transfer sheet, Second substrate
51 Colorant layer
52 Heat sealing layer
20 Thermal transferred image
60 Transfer foil

200 Transfer receiving article
300 Print

The invention claimed is:

1. A combination of an intermediate transfer medium and a thermal transfer sheet, wherein the intermediate transfer medium comprises a substrate and a transfer layer provided on the substrate, wherein the transfer layer has a single layer structure including only a receiving layer or a layered structure including a receiving layer, wherein when the transfer layer has the layered structure, the receiving layer is located furthest from the substrate among layers constituting the transfer layer, wherein the receiving layer contains a binder resin having a number average molecular weight (Mn) of 8000 or more and 32000 or less and a release agent, and wherein the content of the release agent based on the total mass of the receiving layer is 6% by mass or more, wherein the thermal transfer sheet has a colorant layer and a heat sealing layer juxtaposed adjacent to each other on one surface of the substrate, and wherein the heat sealing layer of the thermal transfer sheet contains a binder resin having a number average molecular weight (Mn) of 4,000 or more and 32,000 or less.

* * * * *